United States Patent
Johal et al.

(12) 
(10) Patent No.: US 6,485,627 B1
(45) Date of Patent: Nov. 26, 2002

(54) METHOD AND APPARATUS FOR ELECTROPLATING

(75) Inventors: Charan Preet Singh Johal; John Carey, both of Rugby (GB)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/719,257

(22) PCT Filed: Jun. 10, 1999

(86) PCT No.: PCT/GB99/01837

§ 371 (c)(1),
(2), (4) Date: Feb. 8, 2001

(87) PCT Pub. No.: WO99/66106

PCT Pub. Date: Dec. 23, 1999

(30) Foreign Application Priority Data

Jun. 12, 1998 (GB) .............................. 9812586

(51) Int. Cl.$^7$ .............................. C25D 5/20; C25D 5/10
(52) U.S. Cl. ........................................ 205/148; 205/170
(58) Field of Search ................................ 205/118, 148, 205/170

(56) References Cited

U.S. PATENT DOCUMENTS

| | | | |
|---|---|---|---|
| 4,066,515 A | * | 1/1978 | Stoger et al. ............. 204/14 N |
| 4,436,594 A | | 3/1984 | Nishida et al. |
| 4,596,636 A | | 6/1986 | Lucas |
| 5,141,626 A | | 8/1992 | Tanaka et al. |
| 5,186,811 A | | 2/1993 | Otani et al. |
| 5,200,048 A | | 4/1993 | Tanaka et al. |
| 5,352,350 A | | 10/1994 | Andricacos et al. |
| 5,368,715 A | | 11/1994 | Hurley et al. |
| 5,750,014 A | * | 5/1998 | Stadler et al. .......... 204/224 R |

FOREIGN PATENT DOCUMENTS

| | | | |
|---|---|---|---|
| DE | 33 12 905 A | * | 10/1984 |
| DE | 40 38 108 A | * | 6/1991 |
| DE | 40 38 139 A | * | 6/1992 |
| GB | 2102836 A | * | 2/1983 |
| GB | 2104918 A | | 3/1983 |

OTHER PUBLICATIONS

* References N–R were cited on the International Search Report.*
Derwent English abstracts of DE4038I39A1, DE3312905A1, and DE4038108A1.

* cited by examiner

Primary Examiner—Edna Wong
(74) Attorney, Agent, or Firm—Rader, Fishman & Grauer PLLC

(57) ABSTRACT

A method and apparatus for electroplating at least part of the surface area of an article with a metal coating is described, the method including the steps of: placing the article in a vessel, the vessel being provided with machinery to allow access of fluid to an interior volume; the article being contained in the interior volume and, machinery to allow egress of the fluid; providing the vessel with anode and cathode connections such as to enable the article to become cathodic with regard to an anode extending into the interior volume; providing machinery to cause at least two different fluids including at least one plating electrolyte to be introduced into the vessel in sequence, flow through the interior volume and to exit therefrom for a sufficient time to allow a required thickness of the metal coating to be deposited.

8 Claims, 5 Drawing Sheets

METHOD AND APPARATUS FOR ELECTROPLATING

The present invention relates to a method and apparatus particularly, though not exclusively, for the electro-deposition of metal coatings on plain bearings.

Plain bearings such as are used as crankshaft bearings in internal combustion engines for example, are generally semi-cylindrical in form, a pair of bearings forming a cylinder around each shaft journal usually being used. Each individual semi-cylindrical or half bearing generally comprises two or more layers including: a strong backing material such as steel for example; a lining of a bearing alloy such as an aluminium or copper alloy for example; and, frequently a so-called overlay coating of a softer metal alloy based on alloys of lead, tin, cadmium or zinc for example on top of the bearing alloy lining to provide bearing properties such as conformability and dirt embeddability for example.

Presently, the most commonly used method of providing the overlay coating is by electroplating from solutions containing ions of the required metals in appropriate concentrations in conjunction with either an inert or a consumable anode of the appropriate alloy. In the prior art plating processes, pairs of half bearings are held in stacks in jigs which allow free access of plating solution to the bearings. The jigs then being immersed in open tanks of various chemicals appropriate to the plating process being carried out. A typical prior art plating process may comprise the steps of: initially immersing the jigged bearings in a tank of cleaning fluid; transferring the cleaned bearings in their jig to a water wash tank; immersing the washed bearings in an acid etch tank; transferring the etched bearings to a water wash tank; transferring the washed bearings to a nickel plating tank; transferring the nickel plated bearings to a water wash tank; transferring the washed bearings to a tank for the electro-deposition of an alloy overlay coating; and finally transferring the overlay coated bearings to a water wash tank. Generally the transfer stages between tanks are effected by overhead cranes or conveyors and result in the fluid from one tank draining out of the jig as it is being raised with consequent splashing and risk of contamination and injury to the people operating the process. It must be born in mind that many of the cleaning, etching and plating solutions used comprise extremely toxic and harmful chemicals which, in addition to the danger posed by direct contact with people, may also produce harmful fumes.

A further disadvantage of the prior art process is that much of the time from initially jigging the bearings to removing the plated bearings from the jig is taken up in the transferring from tank to tank and in allowing time for each solution to drain as much as possible to minimise cross contamination between tanks.

A further disadvantage of conventional tank plating systems is that although the plating solutions in the tank are generally stirred, the current density able to be employed without "burning" of the overlay deposit is relatively low leading to relatively long plating times.

GB-A-2 181 744 shows a method of plating an internal surface of a hollow object by providing an internal anode and filling the internal volume of the object with a plating solution. However, the plating solution is only changed if it becomes exhausted and no indication of process conditions are given.

An object of the present invention is to provide a method and apparatus for the electroplating particularly, though not exclusively, of plain bearings, the method and apparatus being less hazardous to people than existing methods and apparatus.

A further object of the present invention is to provide a method and apparatus for the electroplating of plain bearings which is more economic and faster than known methods and apparatus.

Other objects of the present invention will become apparent from the disclosure of the present invention hereinbelow.

According to a first aspect of the present invention, a method for electroplating of a metal coating of at least a part of the surface area of an article includes the steps of: placing the article in a vessel, the vessel being provided with means to allow access of fluid to an interior volume thereof in which volume said article is contained and, means to allow egress of said fluid; providing said vessel with anode and cathode means such as to enable said article to become cathodic with regard to an anode extending into said interior volume; providing means to cause at least two different fluids including at least one plating solution to be introduced into said vessel in sequence, flow through said interior volume and to exit therefrom for a sufficient time to allow a required thickness of said metal coating to be deposited, said at least one plating solution flowing continuously through said vessel during deposition of said metal.

In the case of overlay plating of half bearings for example, the method may typically comprise the steps of clamping the half bearings together in either a generally cylindrical or semi-cylindrical stack for example within the interior volume of the plating vessel; passing a cleaning fluid through the vessel and past at least the bores of the bearings; then pumping water through the vessel to remove the cleaning fluid; next acid to etch the surface on which the overlay is to be deposited; next water to remove residual acid and wash the bearings; next a plating solution to deposit a thin layer of a so-called interlayer such as nickel or copper onto the bearing surface to act as a diffusion barrier between the bearing lining alloy and the overlay; next water to remove the residual interlayer plating solution; next overlay plating solution to deposit the overlay alloy per se; and, finally water to flush away residual overlay plating solution.

It should be emphasised that the above plating sequence is merely exemplary and that more, different or fewer fluid passing steps may be employed depending upon the specific bearing alloy being plated, the overlay alloy composition and the resulting bearing structure which is desired.

In the case of cylindrical or semi-cylindrical articles such as bearings for example, the anode has an elongate form extending into the plating vessel and may be generally coaxial with the bearing bore axis or vessel axis. It has been found that the method of the present invention is inherently a factor of at least about two or three times faster than in the conventional plating process where the jigged bearings are moved from tank to tank due to the higher current densities which may be employed allowing deposition of a given amount of metal in less time. However, it has been found that the speed of the electroplating deposition step per se may be further significantly increased by providing means to enable the anode surface to move such as by rotating, oscillating or reciprocating motion for example.

In one embodiment of the method of the present invention, the anode is provided with a paddle wheel at a position adjacent the fluid inlet means such that the fluid flow itself causes the anode to rotate. The higher the fluid flow rate, the faster the rate of rotation of the anode.

In another embodiment of the method and apparatus according to the present invention, the anode is driven by means of an electric motor thus, allowing independent control of rate of anode surface movement and fluid flow rate.

The use of high plating fluid flow rates such as in the range from about 15 to 40 l/min together with the use of a moving anode surface has enabled higher current densities in the range from about 5 to about 100 A/dm$^2$ for any given step in the plating process to be employed thus producing rapid plating and an overall increase in the speed of the plating process by a factor of four or five. In the prior art plating processes, current densities were limited to about 7 A/dm$^2$ otherwise "burning" of the plated coating occurred as evidenced by black sooty deposits forming on the surface. It is envisaged that flow rates of up to about 160 l/min may eventually be employed giving consequent increases in plating current densities which may be employed and hence reductions in process times.

In addition to the advantage of increases in plating process speed noted above, another considerable advantage of the present invention is that of safety whereby people operating the process are largely separated from the chemicals which are being used since they are contained within the plating vessel and stored in remote closed holding tanks being transported to and from the holding tanks by being pumped through conduits.

According to a second aspect of the present invention, there is provided apparatus for the deposition of a metal coating by electroplating on at least a part of the surface area of an article, the apparatus comprising: a vessel, the vessel having means to allow access of fluid thereinto, said article being contained in said vessel and, means to allow egress of said fluid from said vessel; anode and cathode means such as to enable said article to become cathodic with regard to an anode extending into said vessel; fluid supply means to supply at least two different fluids including at least one plating solution to said vessel in a predetermined sequence; control means to control the flow and sequence of said at least two different fluids to said vessel; means to enable continuous flow of said plating solution during deposition of said metal coating; holding tank means for holding at least some of said different fluids; and, electrical supply and control means to enable said electroplating of said article.

The different fluids may be held in separate tanks from which the fluids may be supplied from and returned to by suitable pump means and conduits connecting the vessel and tanks. The fluids may be supplied to the vessel via suitable valve control means which enable flow to and from the vessel to be initiated and terminated in a predetermined sequence.

The vessel may preferably be closed to the ambient environment so as to obviate spillage of fluid.

The vessel may also have a compressed air supply connected thereto to blow out the bulk of any residual fluids so as to minimise contamination of flushing water.

The fluid holding tanks may be provided with suitable monitoring means to ensure that the required concentrations of chemicals for example are maintained within desired limits.

The anode may be either an inert anode from a metal such as stainless steel or Hastelloy (trade name) for example or may be a consumable anode of the alloy which is being deposited as the overlay coating in the case of bearings, e.g. lead-tin-copper alloy.

The speed of the electroplating process has been found to be greatly enhanced by making the anode move during the process. In one embodiment of the apparatus of the present invention the anode has been provided with a paddle wheel which is driven by the incoming fluid as noted above. However, the speed of rotation is necessarily controlled inter alia by the fluid flow rate and the speed of rotation may thus not be optimum. The anode may alternatively be driven by motor means such as electric or air motor, for example, having speed control means. The anode may alternatively be oscillated about its axis or reciprocated in a direction substantially parallel to its axis or a combination of such motions. It is believed that the increase in plating speed due to anode movement is due to the prevention or limitation of diffusion layers around the anode being formed and thus hindering the free passage of metal ions to the article being plated.

Similarly, the high electrolyte flow rates ensure that there is always a fresh supply of metal ions at the article surface and prevents stagnation at the article surface.

In a preferred embodiment of the present invention, the fluids may be introduced into the vessel in a direction generally parallel to the vessel axis, the vessel axis being preferably generally vertical. The combination of the high plating fluid flow rate and moving anode surface causes turbulence which prevents the formation of a stagnating boundary layer of plating fluid adjacent both the anode surface and the article surface being plated thus, enabling the use of much higher plating current densities than have hitherto been possible.

Preferably, the anode cross section may be such as to cause turbulence in the flowing plating solution during movement thereof. Cross sectional shapes such as rectangular or "S"-shaped for example may be employed.

A yet further advantage of the apparatus and method of the present invention is that the floor space occupied is greatly reduced and holding tanks can be sited closer together and in remote and/or elevated positions away from people thus again improving safety and manufacturing area utilisation.

In order that the present invention may be more fully understood, examples will now be described by way of illustration only with reference to the accompanying drawings, of which:

Figure 1:
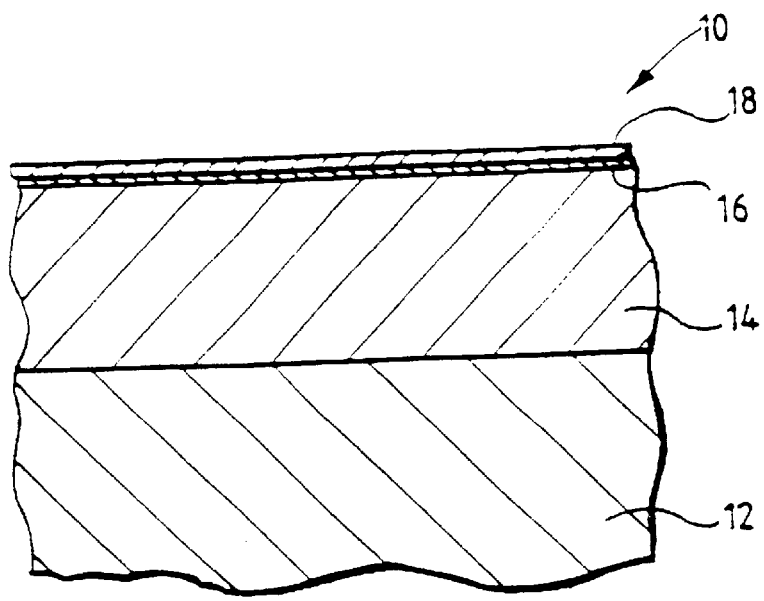
FIG. 1 show a cross section normal to the axis of part of a typical bearing which may be electroplated by the method and apparatus of the present invention.

Referring now to the drawings and where the same features are denoted by common reference numerals.

Figure 2:
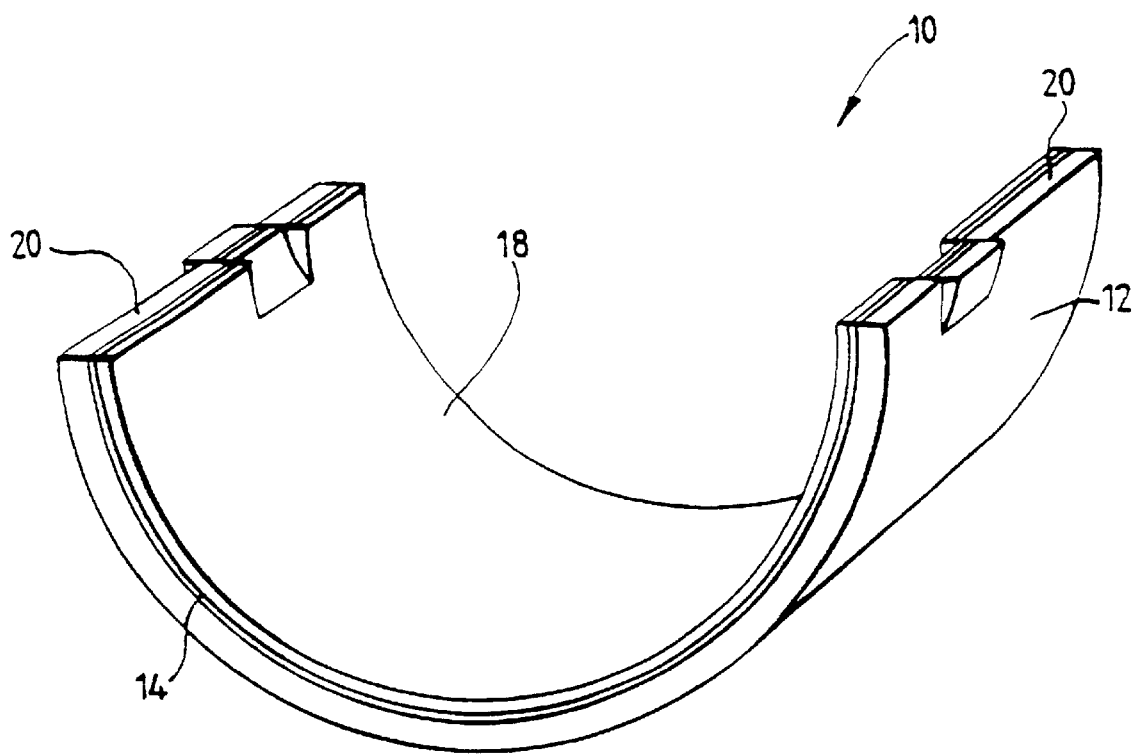
FIG. 2 shows a perspective view of the bearing of FIG. 1.

A half-bearing for an internal combustion engine for example is indicated generally at 10 in FIG. 2. As shown in FIG. 1, the bearing 10 comprises a strong backing 12 from a material such as steel for example; a bearing alloy lining 14 bonded to the backing 12; an interlayer 16; and, an overlay coating 18 forming the actual bearing layer which co-operates with a shaft journal (not shown). The strong backing 12 may be any thickness from about 0.25 mm upwards. The bearing alloy lining layer 14 may be between about 0.25 mm and 1.5 mm in thickness and is generally made from an aluminium alloy or a copper alloy. The interlayer 16 is often nickel or copper, very thin at about 1 or 2 µm and is present as a diffusion barrier to prevent or inhibit diffusion of alloying constituents from the overlay 18 to the bearing alloy lining layer 14 or vice versa. The overlay is generally of a very soft metal alloy and typically based on alloys of: tin; lead; or, zinc and typically has a thickness in the range from about 15 to 30 µm. In FIG. 2, the interlayer 16 is not able to be seen.

The bearing alloy lining 14 is usually bonded to the backing 12 by methods other than electroplating, e.g. casting or roll-pressure bonding for example. The interlayer 16 and overlay 18 are generally deposited onto the lining alloy surface by electroplating.

Figure 3:
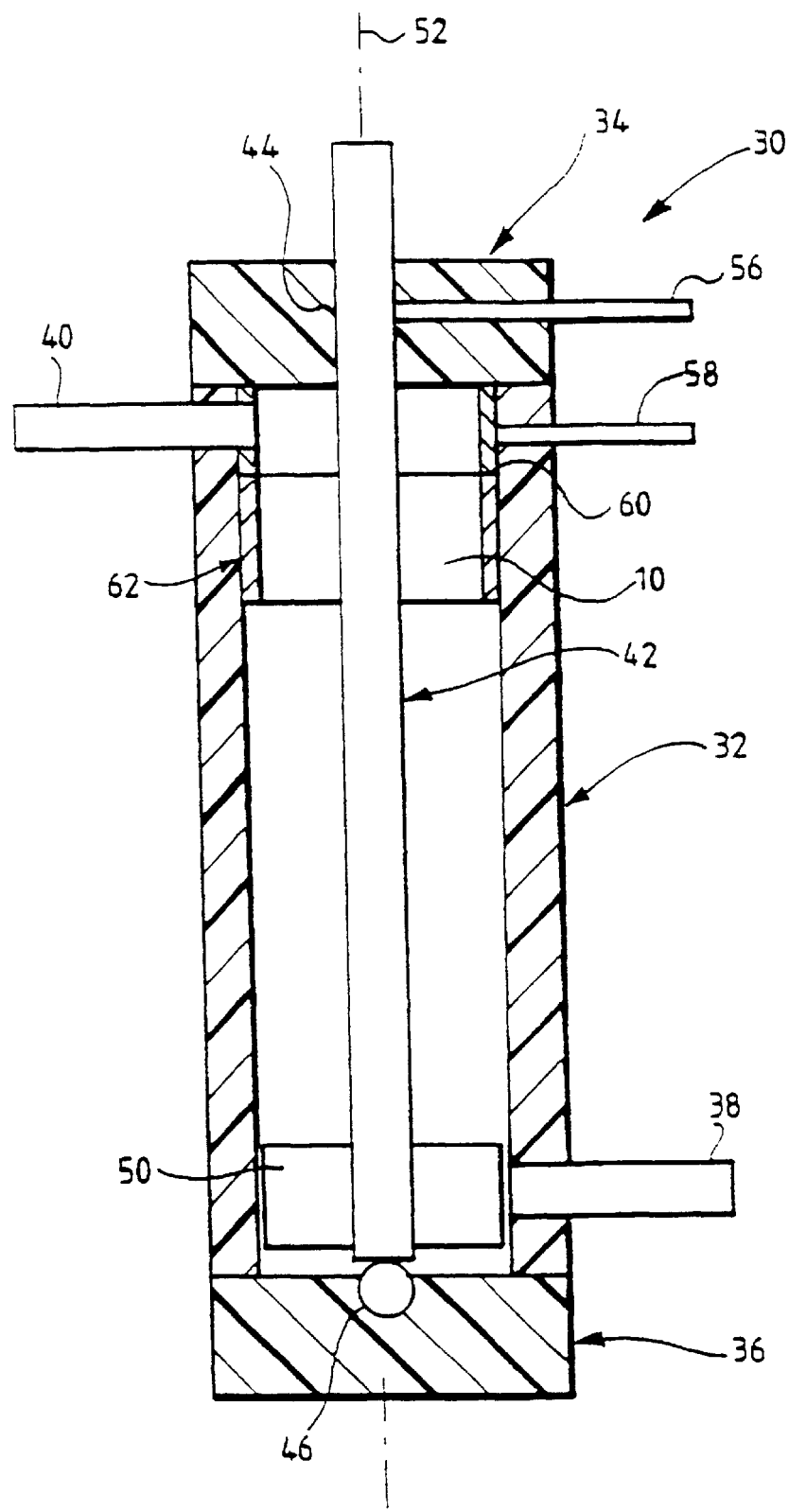
FIG. 3 shows an elevation view of a schematic closed vessel incorporating a jig for the electroplating of bearings according to a first embodiment of the present invention.

FIG. 3 shows a partially sectioned closed vessel 30 for the electroplating of half bearings 10 such as shown in FIGS. 1 and 2. The vessel 30 comprises a generally cylindrical outer body 32 having a top end closure 34 and a bottom end closure 36. The body 32 has a fluid inlet 38 and a fluid outlet 40. An anode 42 is rotatably mounted 44 in the top closure 34 and has a lower bearing 46 in the bottom closure 36. A paddle wheel 50 is fixed to the lower end of the anode and is in the path of the incoming fluid from the inlet 38 which is offset from the vessel axis 52. A rubbing electrical contact brush 56 is positioned at the anode upper end so as to provide electrical current whilst the anode rotates about its axis. A cathode connector 58 extends through the wall of the body portion 32 to make contact with the end face 60 of a stack 62 of half-bearings 10 (only one shown) which are in electrical contact with each other. The body 32 comprises two half portions 70, 72 with an axially directed split 74 along a diameter of the body. When a semi-cylindrical stack 62 of bearings is employed, the half body portion 70 has a slightly smaller internal diameter than half portion 72 so as to hold the bearings 10 in place by clamping against the joint faces 20 thereof.

Figure 4:
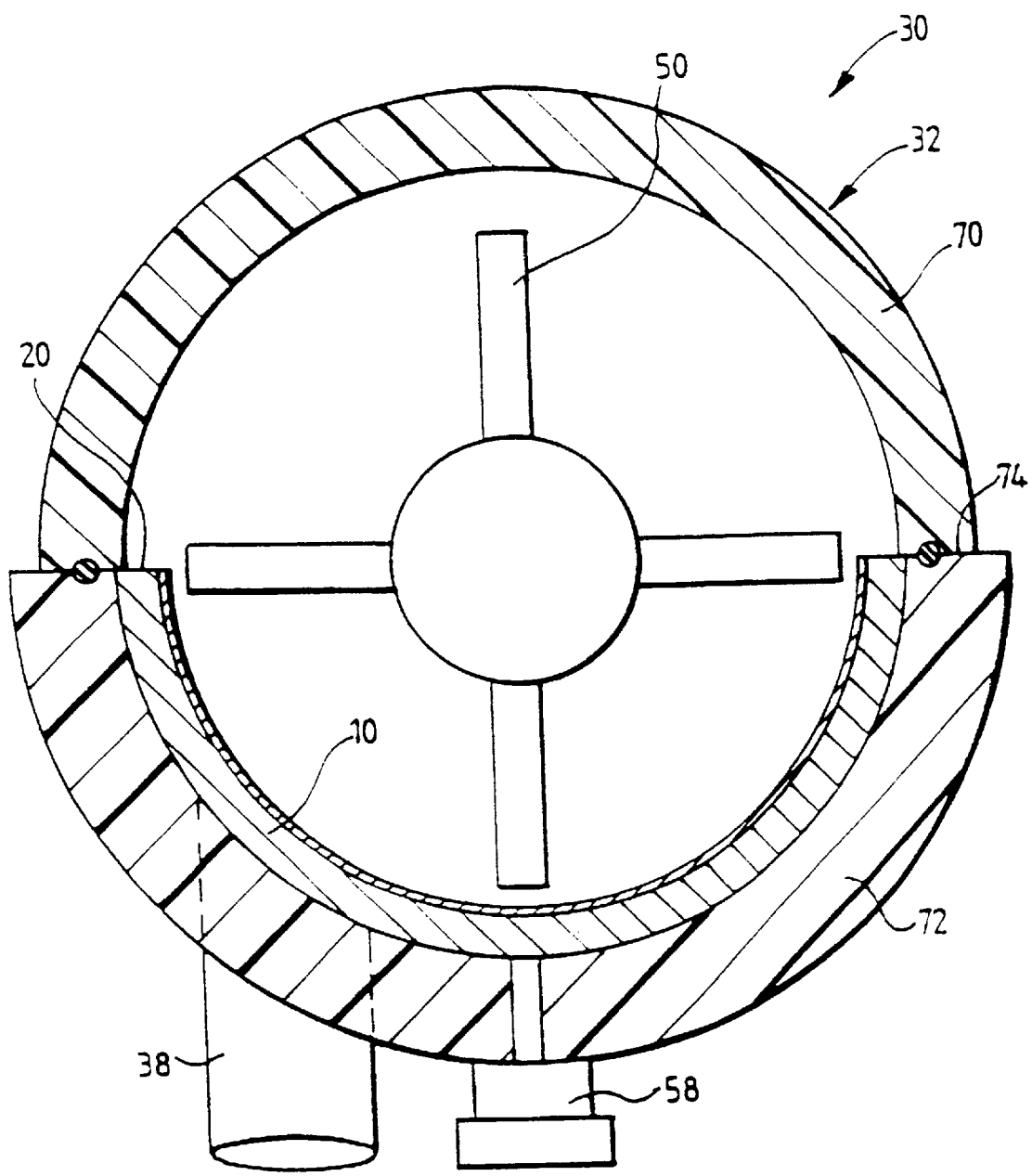
FIG. 4 shows a cross section through the vessel of FIG. 3.
Figure 5:
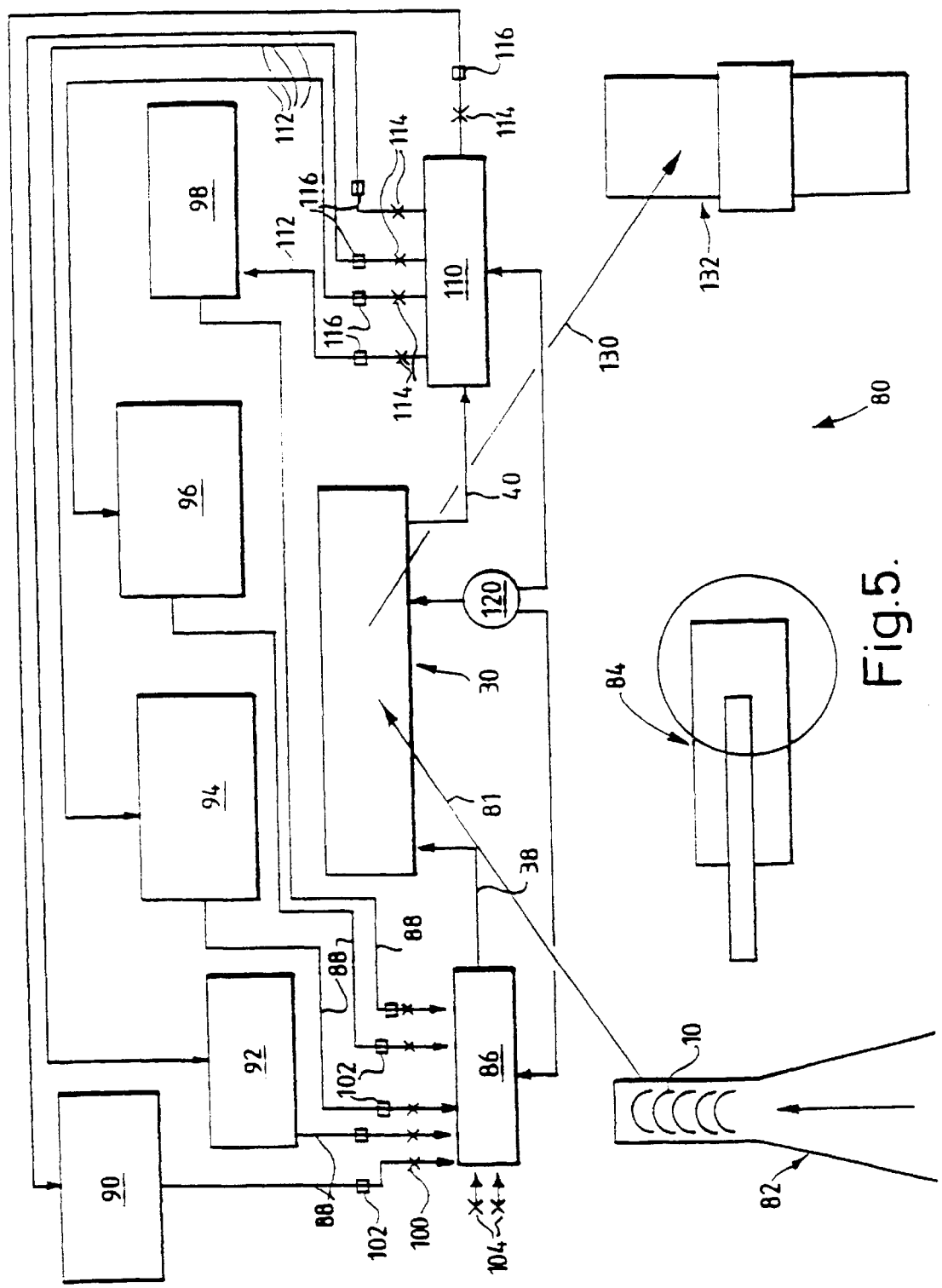
FIG. 5 shows a schematic layout of apparatus according to the present invention.

FIG. 5 shows a schematic layout of an electroplating apparatus 80 according to the present invention. The apparatus takes half-bearings 10 from a machining line 82, the bearings 10 then being loaded (indicated by the arrow 81) into a vessel 30 of the type described with reference to FIGS. 3 and 4 by means of a robotic device 84. The vessel 30 is connected by its inlet conduit 38 to an inlet selector valve block 86 which in turn is individually connected via conduits (indicated in all cases by reference numeral 88) to a flushing water supply tank 90; a tank of alkaline cleaning fluid 92; a tank of acid etching fluid 94; a tank of interlayer plating solution 96; and, a tank of overlay plating solution 98. The conduits 98 linking the valve block 86 to the various tanks have valves (indicated in all cases by reference numeral 100) to enable fluid flow to be started or stopped. Supply pumps (indicated in all cases by reference numeral 102) are included in the conduits 88. A compressed air supply 104 is also provided to blow residual fluids out of the valve block 86 and vessel 30 interior volume after the valves 100 from any individual tank have been closed. The vessel outlet conduit 40 is connected to an outlet selector valve block 110 which is in turn connected via conduits (112 in all cases) to the appropriate tank, the conduits 112 having valves (114 in all cases) and pumps (116 in all cases) therein. The vessel has an electrical power supply 120 and control system connected thereto to supply current for plating as appropriate and control of the valve blocks 86, 110 to initiate or terminate fluid flow as required. once the plating process has finished, the plated bearings are transferred (indicated by the arrow 130) from the vessel 30 to a drying and oiling station 132 by the robotic device 84.

In operation, the valves 100 and 114 in the circuit containing the alkaline cleaning fluid tank 92 are opened and fluid is pumped through the vessel 30 via the valve blocks 86, 110 to remove grease and other contaminants from the bearing surface to be plated and returned to the tank 92 via the valve 114 and conduit 112. Once the cleaning step has been completed, the valve 100 is closed but valve 114 remains open and compressed air from the supply 104 is blown through the valve block 86, vessel 30 and valve block 110 after which the air supply is stopped and valve 114 closed. The vessel is then flushed out with water from the tank 90 by operation of the appropriate valves and pumps. These steps are then repeated with the appropriate valves in circuits for the acid etch tank 94; interlayer plating solution tank 96; and, overlay plating solution tank 98 with water flushing steps in between each stage.

Shown below are three tables: Table 1 and Table 2, which give the processing details for the deposition of a lead/tin/copper and a lead/indium overlay onto copper based alloy bearing surfaces, respectively; and Table 3 which gives the processing details for the deposition of a lead/copper/tin overlay onto an aluminium alloy. The column on the right of each table specifies the particular plating process stage step and the following columns specify the current density and the time taken to complete the particular step for the inventive "High Speed" process and for a "Conventional" plating process utilising separate tanks as in the prior art.

TABLE 1

Lead/Tin/Copper Overlay

| Process stage | High Speed | Conventional |
| --- | --- | --- |
| 1. Pretreatment A | 10 A/dm$^2$, 1 min, 50° C. | 3 A/dm$^2$, 5 mins, 50° C. |
| 2. Cold water rinse | 30 secs | 2 mins |
| 3. Pretreatment B | 3 A/dm$^2$, 30 secs ambient | 3 A dm$^2$, 30 secs ambient |
| 4. Pretreatment C | 30 secs, ambient | 1 min |
| 5. Cold Water rinse | 30 secs | 2 mins |
| 6. Nickel plate | 10 A/dm$^2$, 1 min, 50° C. | 2 A/dm$^2$, 4 mins, 50° C. |
| 7. Cold water rinse | 30 secs | 2 mins |
| 8. Lead/tin/copper plate | 45 A/dm$^2$, 1 min, ambient | 3 A/dm$^2$, 16 mins, ambient |
| 9. Cald water rinse | 30 secs | 2 mins |
| 10. Hot water rinse | 1 min, 90° C. | 1 min, 90° C. |
| Total Time | 7 mins | 35 mins 30 secs |

The pre-treatments A, B and C referred to in the first Column relate to treatments with acids and/or alkalis as appropriate in order to improve adhesion of the plated layers. In this particular example, a nickel interlayer is deposited on the copper alloy bearing surface prior to deposition of the lead/tin/copper overlay.

As may be seen from Table 1, the increased current densities able to be employed without detrimental effect and the reductions in time for each stage are considerable and amount to a reduction in overall process time of 80%.

TABLE 2

Lead/Indium Overlay

| Process stage | High Speed | Conventional |
| --- | --- | --- |
| 1. Alkali clean | 15 A/dm$^2$, 1 min, 45° C. | 3 A/dm$^2$, 4 mins, 45° C. |
| 2. Cold water rinse | 30 secs | 2 mins |
| 3. Lead plate | 25 A/dm$^2$, 1 min, ambient | 2.5 A/dm$^2$, 6 mins, ambient |
| 4. Cold water rinse | 30 secs | 2 mins |
| 5. Activation | 30 secs, 35° C. | 1 min, 35° C. |
| 6. Cold water rinse | 30 secs | 1 min |
| 7. indium plate | 18 A/dm$^2$, 30 secs, ambient | 3 A/dm$^2$, 4 mins, 30° C. |

TABLE 2-continued

Lead/Indium Overlay

| Process stage | High Speed | Conventional |
|---|---|---|
| 8. Cold water rinse | 30 secs | 2 mins |
| 9. Hot water rinse | 1 min, 90° C. | 1 min, 90° C. |
| Total Time | 6 mins | 23 mins |

Similarly to the process exemplified in Table 1, Table 2 shows large increases in current density for the overlay deposition steps with consequent reductions in time at each stage with an overall reduction in process time of 74%.

TABLE 3

Lead/Tin/Copper Overlay

| Process stage | High Speed | Conventional |
|---|---|---|
| 1. Pretreatment A | 1 min, 70° C. | 2 min, 70° C. |
| 2. Cold water rinse | 30 secs | 2 mins |
| 3. Pretreatment B | 45 secs, 45° C. | 1 min, 45° C. |
| 4. Cold water rinse | 30 secs | 2 mins |
| 5. Pretreatment C | 15 secs, ambient | 30 secs |
| 6. Cold water rinse | 30 secs | 2 mins |
| 7. Activation | 1 min, ambient | 1 min, ambient |
| 8. Cold water rinse | 30 secs | 2 mins |
| 9. Nickel plate | 10 A/dm$^2$, 1 min, 50° C. | 2 A/dm$^2$, 4 mins, 50° C. |
| 10. Cold water rinse | 30 secs | 2 mins |
| 11. Lead/tin/copper plate | 45 A/dm$^2$, 1 min, ambient | 3 A/dm$^2$, 16 mins, ambient |
| 12. Cold water rinse | 30 secs | 2 mins |
| 13. Hot water rinse | 1 min, 90° C. | 1 min, 90° C. |
| Total Time | 9.5 mins | 37.5 mins |

As with Tables 1 and 2, it is clear that substantial reductions in plating time of about 75% may be achieved with the method of the present invention when used with aluminium alloys.

Figure 6:
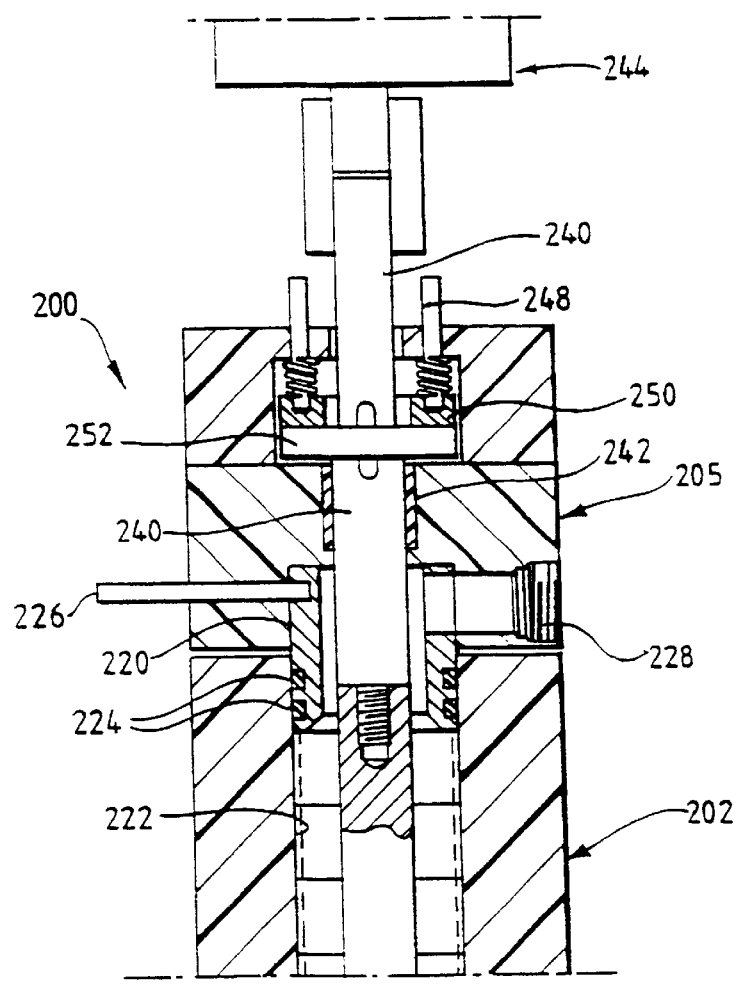
FIG. 6 which shows a cross section of part of a plating vessel according to a second embodiment of apparatus according to the present invention.
Figure 6:
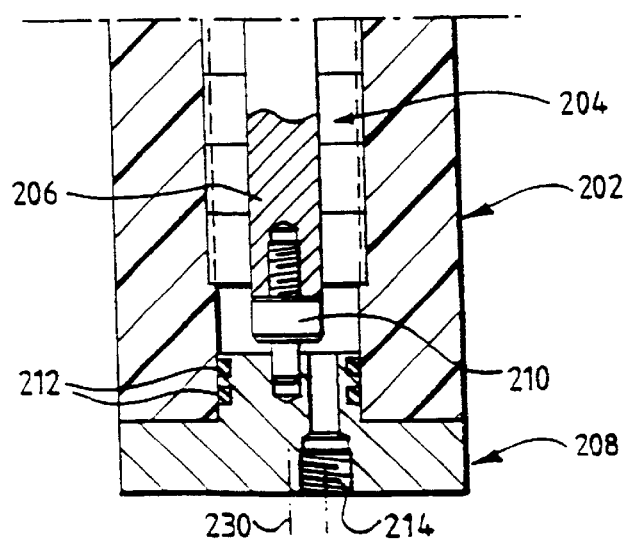

FIG. 6 shows a cross section of a second embodiment 200 of an electroplating vessel of apparatus according to the present invention. The vessel 200 comprises a central portion 202 in which a stack of half bearings 204 are held; a top portion 205 in which the anode 206 is held; and, a lower closure portion 208 which provides a lower closure for the vessel and a bearing support 210 for the lower end of the anode 206. The lower closure portion 208 is sealed to the central portion 202 by "O" rings 212 and is also provided with a fluid entry port 214 through which all of the necessary fluids for the plating process are introduced into the vessel 200. The top portion 205 has a cylindrical spigot 220 sealed to the bore 222 of the central portion by "O" rings 224 and a cathode connector 226 by which an electrical connection is made to the bearings 204. The spigot 220 also has a fluid exit port 228 which is connected to a valve block manifold (not shown but as indicated with reference to FIG. 5). The port 228 is of larger area than the inlet port 214 and effectively provides a weir. Although the flow rates of the fluids are relatively high, the fluids are not under any particular back pressure other than that exerted by their head. The axis 230 of the vessel is substantially vertical as this obviates the formation of air pockets within the vessel. The, anode 206 is fixed to a rotatable metal journal 240 which runs in a plastics material bearing 242. The journal is driven by an electric motor 244 having speed control, the journal 240 consequently driving the anode 206 by rotation. The lower end of the anode is rotationally supported by the bearing 210. Current is supplied to the anode by means connectors 248 which are located in a graphite ring 250 which rubs against a flange portion 252 of the metal journal 240.

The operation of the vessel of FIG. 6 is similar to that described with reference to FIGS. 3 to 5. However, the speed of rotation of the anode 206 is controlled independently of the flow rate of the plating solution. Rotation of the anode together with the high fluid flow rate causes turbulence, but not cavitation, the turbulence preventing the formation of stagnating boundary layers adjacent the anode and bearing surface to be plated. In FIG. 6, the cross sectional shape of the anode is of flat bar form.

It is clear that the process and apparatus of the present invention provides a very large improvement in plating process time reduction and also safety in that people operating the process and apparatus are substantially separated from the chemicals involved.

What is claimed is:

1. A method for electroplating of a metal coating of at least a part of the surface area of an article includes the steps of:

placing the article in a vessel, the vessel being provided with means to allow access of fluid to an interior volume thereof in which volume said article is contained and, means to allow egress of said fluid;

providing said vessel with anode and cathode means such as to enable said article to become cathodic with regard to an anode extending into said interior volume of said vessel; and providing means to cause at least two different fluids, including at least one plating solution, to be introduced into said vessel in sequence, to flow through said interior volume and to exit therefrom, said flow being for a sufficient time to allow a required thickness of a metal coating to be deposited on said article, said at least one plating solution flowing continuously through said vessel during deposition of said metal coating onto said article said vessel being closed to an ambient environment, said fluids being stored in remote holding tanks and are being transported to the vessel from the holding tanks by being pumped through conduits, wherein said anode is moved during said deposition of said metal coating.

2. The method according to claim 1, wherein there are a plurality of articles held in a cylindrical or semi-cylindrical stack within the vessel.

3. The method according to claim 1, wherein said anode is of elongate form and substantially parallel with an axis of said stack.

4. The method according to claim 1, wherein a flow rate of the plating solution is in the range from about 15 to 40 l/min.

5. The method according to claim 1, wherein a flow rate of the plating solution is in the range from 40 to 160 l/min.

6. The method according to claim 1, wherein a plating current density is in the range from about 5 to about 100 A/dm$^2$.

7. The method according to claim 1, wherein said fluids are circulated from said holding tanks.

8. The method according to claim 1, wherein said anode is moved by at least one of rotation, oscillation or reciprocation.

* * * * *